Jan. 28, 1964   J. E. PETERSEN ETAL   3,119,505
LOADING APPARATUS
Filed Feb. 28, 1961   2 Sheets-Sheet 1
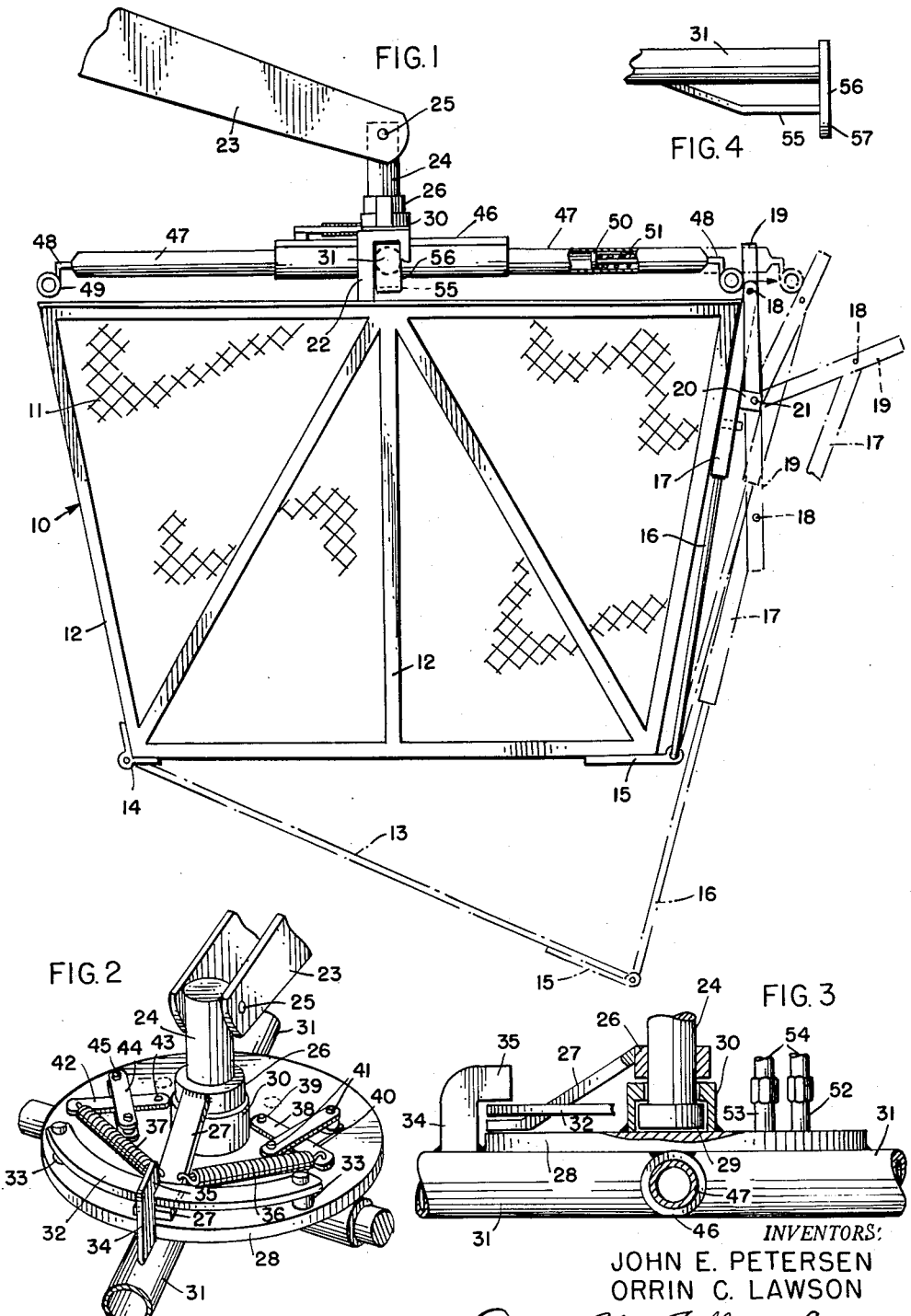
INVENTORS:
JOHN E. PETERSEN
ORRIN C. LAWSON
BY Dawson Tilton Fallon & Lungmus
ATT'YS

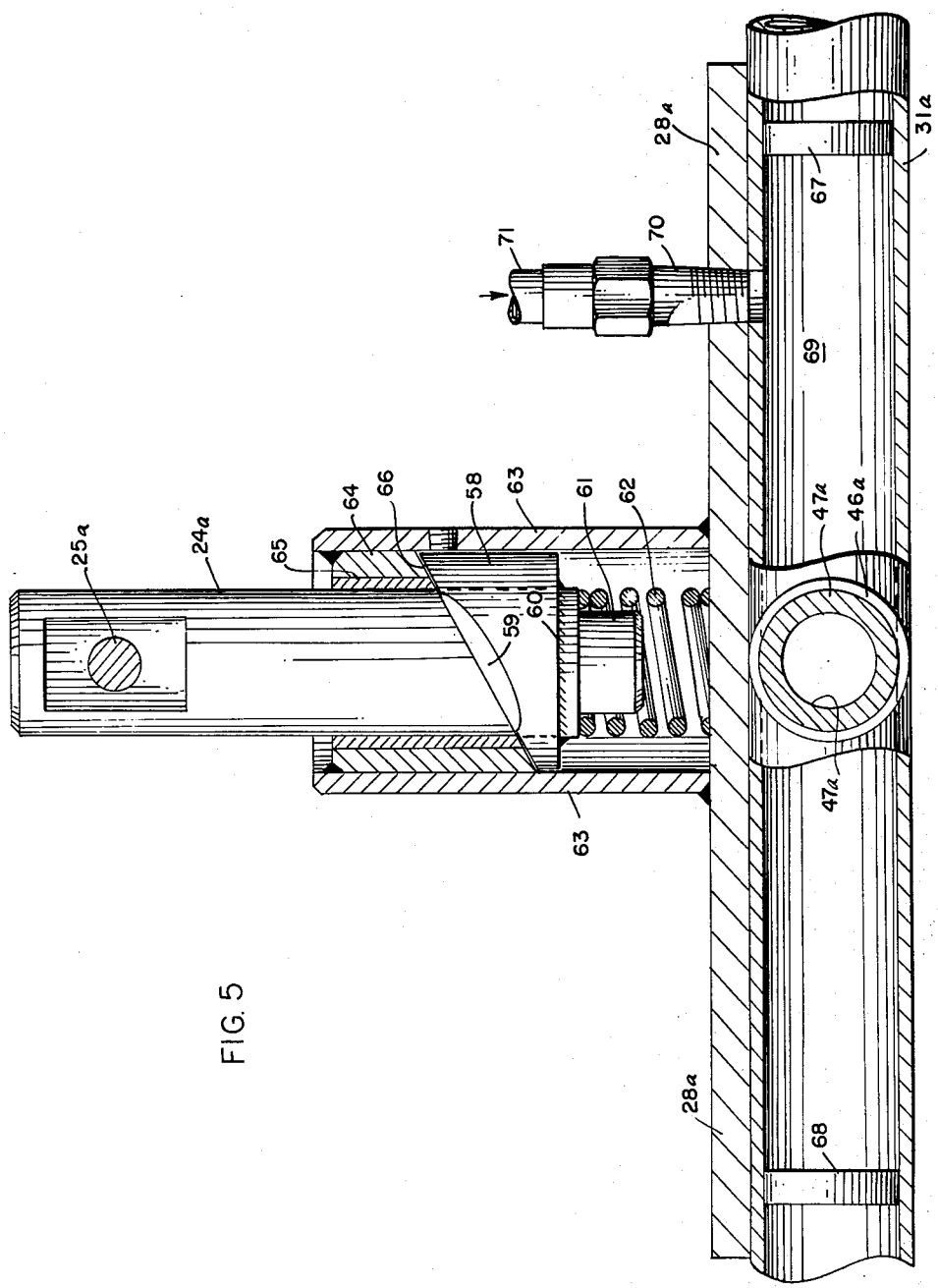

United States Patent Office 3,119,505
Patented Jan. 28, 1964

3,119,505
LOADING APPARATUS
John E. Petersen and Orrin C. Lawson, Lake Wales, Fla., assignors to Petersen Industries, Inc., Lake Wales, Fla., a corporation of Florida
Filed Feb. 28, 1961, Ser. No. 92,339
7 Claims. (Cl. 214—653)

This application relates to loading apparatus, and more particularly to apparatus in which containers filled with fruit or other products are lifted for stacking or for the discharge of the contents, etc.

The present application is a continuation-in-part of our copending application, Serial No. 9,766, filed February 19, 1960, now Patent No. 2,981,424.

An object of the invention is to provide simple and effective means for picking up baskets equipped with hooks or other connections and for stacking the baskets for discharging the contents thereof into a larger container such as a truck. A further object is to provide in such a structure power trip means enabling the operator to open a container while the same is in a raised position for discharging the contents. Yet another object is to provide in such a device sheltering means in which the moving parts are insulated against contact with the fruit or other contents of the container. A still further object is to provide a compact sturdy device in which lift arms for engagement with baskets are releasably centered with respect to a lifting device while at the same time permitting the arms to rotate successively into engagement with container connections, limit means being provided for limiting the movement of the lift arms with respect to the lift device. Other specific objects and advantages will appear as the specification proceeds.

The invention is shown, in a specific embodiment, by the accompanying drawing, in which—

FIG. 1 is a side view in elevation of a container and lift device embodying our invention; FIG. 2, an enlarged broken perspective view of the lift mechanism shown in FIG. 1; FIG. 3, a broken elevational and part-sectional view of the structure shown in FIG. 2; FIG. 4, a broken detail view of one end of a lifting arm; and FIG. 5, a broken sectional view of a modified form of the invention.

In the illustration given in FIGS. 1 to 4, inclusive, 10 designates a container which is in the form of a basket having a wire mesh body 11 and a frame 12. The open bottom of the basket is adapted to be closed by a bottom plate 13 movably secured to the frame 12 by the hinge 14. At the other end of the bottom 13 is secured a hinge 15 to which an actuating rod 16 is pivotally connected. The rod 16 is fixed to a strap 17 which at its upper end is connected by pivot pin 18 to a latch strap 19. The latch strap 19 is pivotally connected to spaced bracket arms 20 by the pivot pin 21. Thus, when the bottom 13 is in closed position, the rod 16, strap 17, and the lever 19 occupy the position shown in solid lines in FIG. 1. When the lever arm 19 is moved outwardly as indicated by the position of the parts in dotted lines, the lever 19 passes over center and the parts collapse to the open position shown in dotted lines in FIG. 1, thus permitting the contents of the basket to be discharged.

The container 10 is provided near its center with two oppositely-disposed and upwardly-extending hooks 22, the hook members preferably having relatively high shanks, as indicated in the side view of FIG. 1.

The pick-up mechanism embodying our invention may be employed with any lift device such as a boom or lift arm of a truck or other lift mechanism. In the specific illustration given, we have shown the boom 23 of a lift truck as illustrative of such lift devices. A shaft 24 is fixed by pivot pin 25 to the spaced ends of the boom 23 and to the shaft 24 is fixed by welding a ring 26 having welded thereto a centering arm or strap 27. The strap 27 extends downwardly and outwardly over a circular disc 28. Shaft 24 is rotatably secured to the disc 28 in any suitable manner. In the specific illustration given, the shaft 24 is provided with an enlarged disc 29 received within a recess provided by collar 30, which in turn is welded to the disc 28.

Secured to the underside of the disc 28 by welding or other suitable means are the lift arms 31 which extend laterally for engagement with the hooks 22 of the basket, which always face in the same direction.

Secured to the disc or plate 28 is an arcuate retainer strap 32, the strap being supported at a spaced distance above the disc 28 by the spacer posts 33. The central portion of the retainer bar 32 is reinforced by a vertical strap 34 which is welded to a lift arm 31 and has at its top an inwardly-extending portion 35 which extends over the arcuate retainer 32, as shown more clearly in FIGS. 2 and 3.

With the foregoing structure, the centering strap 27 may swing laterally with respect to the strap 32, but the movement of the strap is limited by the posts 33.

In order to retain the disc 28 or the lift arms 31 at a predetermined relative position with respect to the shaft 24, we provide centering springs 36 and 37 which have their end portions extending through apertured portions of the strap 27 and are thus fixed thereto. The outer end of spring 36 is fixed to a swing lever 38 which is pivotally connected to the disc 28 by pin 39. The lever 38 is confined within limits of movement by a retainer strap 40 secured by posts 41 at a spaced distance above the plate 28. Similarly, spring 37 is secured at its outer end to a lever 42 connected to the disc 28 by pivot pin 43 and the lever 42 is confined for limited movement by strap 44 supported at a spaced distance above the disc 28 by posts 45. With this structure, the lift arms 31 are free to move relatively to the shaft 24 while the arms are engaging the hooks of a basket, but as soon as the basket is lifted, the centering springs 36 and 37 with the mechanism shown restore the lift arms to their initial or predetermined position with respect to the shaft 24.

With the structure described, the lever operating mechanism, namely, all of the exposed moving parts, are supported above and out of contact with the fruit or other contents of the container so that these parts may function in their centering operations without injuring the fruit or being interrupted in operation by contact with the contents of the basket.

For actuating the release lever 19 so as to open the basket, we provide cylinders 46 in which are mounted hydraulic cylinders 47 for moving outwardly the shafts 48 into engagement with the lever 19. Each shaft 48 is preferably provided with a short tubular piece 49 for engagement with the lever 19 in the tripping action.

The hydraulic cylinder 47 may be equipped with a piston 50 secured to the shaft 48, and springs 51 may be provided for returning the piston to its initial position. If desired, the spring may be omitted and a double-acting piston cylinder employed. Actuating fluid is supplied to the cylinders 47 by the pipes 52 and 53 which extend through the disc 28 and communicate with the respective cylinders. Connected to the pipes 52 and 53 are flexible pipes 54 leading to a source of pressure fluid.

As shown more clearly in FIG. 4, the end portion of the lift arms 31 is provided with a stabilizing strap 55, the inner end of the strap being welded to the arm 31 and the outer end of the strap being secured to the end of the lift arm by a depending strap 56. The strap 56 at the end of one lift arm has a depending flange 57 which is useful in retaining the lift arm upon the basket. We prefer, however, to omit the depending flange 57 at the end of the other strap, as illustrated best in FIG. 1, so as to facilitate engagement of the strap with the hook. In the lifting of heavy baskets or containers, there is a tendency for the container to swing as it leaves the ground, and the swinging action makes it difficult for the truck operator to place his load and to move it to the desired position. However, with the structure shown in which there is a spaced strap 55 extending well below the tubular arm 31, it is found that the wedging of the tube within the hook simultaneously with the engagement at a spaced distance below the strap 55 with the high shank of the hook 22, there is a rigid interlock between the lift arm and the basket, and no tendency for the container to rock in the loading operation.

*Operation*

In the operation of the apparatus, the container 10 is normally placed within the row of fruit trees, as, for example, in a row of orange trees, and is filled with the fruit, the bottom 13 of the basket being locked as shown in solid line in FIG. 1. The truck equipped with the lift device approaches the basket and the operator brings the lift arms 31 successively into engagement with the hooks 22 of the basket. For ease in making the connection, the lift arm 31 which does not have the depending ledge 57 is first brought into engagement with the hook 22 and then the other lift arm having the depending ledge 57 is brought into engagement with its hook, and in this action the disc 28 rotates upon shaft 24, permitting the relative movement of the arms 31 and tensioning one of the springs 36 or 37. At the same time, the engagement of the lift arms with the hooks automatically aligns one of the power cylinders 47 with the lever 19. The boom 23 is then raised and as the basket leaves the ground or other supporting surface, the tensioned spring restores the disc 28 and the lift arms 31 to their original position relative to the shaft 24. The operator can now move the container rapidly to a point over a truck or other receptacle and by admitting pressure fluid to a power cylinder, cause the trip 49 to press the lever 19 outwardly to the release position shown in FIG. 1. The empty basket can then be returned to the fruit tree rows for refilling, the latch lever 19 being moved again to the position shown in solid lines in FIG. 1.

In the modification shown in FIG. 5, the centering of the parts is accomplished by cam means with or without the use of a compression spring. In this modification, the shaft 24a is connected by a pin 25a to the boom in the manner shown in FIGS. 1 to 4, inclusive. The shaft 24a, however, is provided at its lower end with a cam member or pad 58 extending about the shaft and which may be preferably provided with an anti-friction pad portion 59. The cam member 58 is welded upon the shaft 24a as indicated at 60, and the shaft is provided with a depending portion 61 of reduced cross section adapted to receive a compression spring 62.

Welded to the disc 28a is a tubular casing or well 63 having at its upper end a sleeve 64 and a bushing, which is preferably a bronze bushing, 65. The sleeve 64 and bushing 65 are provided at their lower edges with a cam face 66 meeting the cam face of the pad 58. The cam 58 carried by the shaft 24a and the cam provided by the sleeve 64 are aligned with their faces in contact when the parts are in the position shown in FIG. 5, with the lifting arms extending transversely of the boom. When the lifting arms are moved away from this position in order to engage the hooks of the basket, the cam faces separate, causing a compression of the spring 62.

In the modification shown in FIG. 5, we provide a further improvement in which the tubular member forming the lifting arms is sealed off with rings 67 and 68 to provide a manifold chamber 69 which has communication with the power cylinder 47a within sleeve 46a. Such communication is shown provided with the rear open portion of the member 47a, but, if desired, a small aperture may be provided to establish communication between the chamber of the hydraulic or power cylinder 47a and the manifold 69. With the arrangement shown, a single nipple 70 may be employed to furnish the hydraulic fluid to the chamber 69 and a single flexible member 71 communicating with the nipple 70 and the source of fluid is used.

Summarizing the operation of the modified structure shown in FIG. 5, the disc 28a and its lift arms and power cylinders are employed as described heretofore in connection with FIGS. 1-4, inclusive. When the lift arms are moved into engagement with the hooks of the basket, the cam 66 carried by the well 63 wedges against the cam 58 of the shaft 24a so as to separate the members, with the cam 66 moving upwardly with respect to the boom-supported cam 58 and thereby compressing spring 62. When the basket is lifted so as to clear the ground, the weight of the basket as well as the weight of the disc 28a causes the upper cam face 66 to ride downwardly to the aligned position shown in FIG. 5, thus centering the disc and the lift arms with respect to the shaft 24a. This movement is assisted by the action of the spring 62. If desired, however, the spring 62 may be omitted, since the cam faces themselves automatically realign or center the parts. In fact, the centering is accomplished without the additional weight provided by the basket, the weight of the disc 28a and the parts carried thereby being sufficient to bring the cams to their aligned position shown in FIG. 5.

In normal operation, the parts remain in the centered position shown in FIG. 5 at substantially all times except when the lifting arms are being moved into successive engagement with the hooks of the basket on the ground. As above described, the weight of the basket accelerates the action of the cams in restoring the parts to their initial centered position when the basket is lifted from the ground.

While, in the foregoing description, we have set forth a structure and procedure in considerable detail for the purpose of illustrating the invention, it will be understood that such details of structure and operation may be varied widely by those skilled in the art without departing from the spirit of our invention.

We claim:

1. In combination with a lift device, a disk rotatably secured upon said lift device, lift arms fixed to said disk and extending laterally thereof for engagement with containers, and centering means for restoring said arms, when the same are rotated in the container-engaging operation, to their initial position relative to said lift device, said centering means comprising a hollow casing receiving said lift device and carried by said disk and provided also interiorly with an annular cam having the lower face thereof inclined and a laterally-extending cam carried by said lift device below said first-mentioned cam and having an upwardly-extending inclined face aligned with the inclined face of said first-mentioned cam, said disk being rotatably supported by said cams.

2. The structure of claim 1 in which spring means urges said laterally-extending cam toward said first-mentioned cam.

3. In combination with a container lift device equipped with a depending shaft, a disk equipped with a hollow casing rotatably receiving said shaft, a cam carried by the upper portion of said casing and having an inclined lower bearing face, a laterally-extending cam carried by the lower portion of said shaft within said casing and having on its upper side an inclined face normally aligned with the face of said first-mentioned cam, lift arms fixed to the disk and extending laterally thereof for engagement with containers, said cams having their inclined faces aligned when said arms are in a predetermined position relative to the shaft but separating when said arms are moved away from said predetermined position for engagement with said containers.

4. The structure of claim 3 in which a compression spring is mounted within said casing between said disk and said shaft.

5. In combination with a container lift device equipped with a depending shaft, said shaft having a laterally-extending cam provided on its upper side with an inclined face, a hollow casing member rotatably receiving said shaft, and lift arms fixed to said casing member and extending laterally thereof for engagement with containers, said hollow casing being provided interiorly with an annular cam provided on its underside with an inclined face adapted to be aligned with and bearing against the cam face of said shaft, said casing providing a bore for guiding said shaft cam during relative rotation of the cams.

6. In combination with a container lift device equipped with a depending shaft, a disk provided with a hollow casing receiving said shaft for rotatable and axial movement, an annular cam carried interiorly by said casing and having an inclined face on its underside, a laterally-extending cam carried by said shaft and having its upper side provided with an inclined face complementary to the face of said first-mentioned cam, and lift arms fixed to the disk and extending laterally thereof for engagement with containers, said lift arms when rotated in the container-engaging operation causing separation of said cams and the weight of said arms and container causing said cams to move into aligned position and thus to restore said arms to their initial position relative to said shaft.

7. The structure of claim 6 in which spring means urge said cam members into aligned position.

References Cited in the file of this patent
UNITED STATES PATENTS
2,981,424    Petersen _____ Apr. 25, 1961